US 6,452,933 B1

(54) FAIR QUEUING SYSTEM WITH ADAPTIVE BANDWIDTH REDISTRIBUTION

(75) Inventors: Nicholas G. Duffield, Hoboken; Tirunell V. Lakshman, Monmouth; Dimitrios Stiliadis, Hoboken, all of NJ (US)

(73) Assignees: Lucent Technologies Inc., Murray Hill; AT&T Corp., Basking Ridge, both of NJ (US)

( * ) Notice: Subject to any disclaimer, the term of this patent is extended or adjusted under 35 U.S.C. 154(b) by 0 days.

(21) Appl. No.: 08/972,424

(22) Filed: Nov. 18, 1997

Related U.S. Application Data

(60) Provisional application No. 60/037,844, filed on Feb. 7, 1997.

(51) Int. Cl.[7] .................................................. H04J 3/16
(52) U.S. Cl. ........................................ 370/415; 370/468
(58) Field of Search .............................. 370/252, 253, 370/412, 413, 414, 415, 416, 417, 418, 428, 429, 465, 468, 395

(56) References Cited

U.S. PATENT DOCUMENTS

| | | | | |
|---|---|---|---|---|
| 5,432,790 A | | 7/1995 | Hluchyj et al. | 370/95.1 |
| 5,463,620 A | * | 10/1995 | Sriram | 370/412 |
| 5,629,928 A | * | 5/1997 | Calvignac et al. | 370/237 |
| 5,793,747 A | * | 8/1998 | Kline | 370/230 |
| 5,796,719 A | * | 8/1998 | Peris et al. | 370/231 |
| 5,923,656 A | * | 7/1999 | Duan et al. | 370/412 |
| 5,946,297 A | | 8/1999 | Calvignac et al. | 370/230 |

FOREIGN PATENT DOCUMENTS

| | | | |
|---|---|---|---|
| WO | WO 97/14240 | 4/1997 | H04L/12/56 |

OTHER PUBLICATIONS

Supporting Real–Time Applications In An Integrated Services Packet Network: Architecture And Mechanism.

* cited by examiner

*Primary Examiner*—Ricky Ngo
(74) *Attorney, Agent, or Firm*—M. J. Hodulik

(57) ABSTRACT

Apparatus for routing packets in a communication network comprises a plurality of per-connection queues, each queue established for receiving packets from a respective source and temporarily storing received packets before routing to a particular destination; a weighted fair-queuing scheduler for servicing packets from each of the plurality of per-connection queues at guaranteed pre-allocated rates; a sensing device for sensing a presence or absence of packets in queues, the absence of packets in queues indicating availability of excess bandwidth; and, a state dependent scheduler for redistributing excess bandwidth upon sensing of queues absent packets, the state dependent scheduler servicing those queues in accordance with a state variable corresponding to a performance property of the queues, wherein delay and isolation properties for routing packets of respective queues in weighted fair-queuing is preserved.

8 Claims, 1 Drawing Sheet

FAIR QUEUING SYSTEM WITH ADAPTIVE BANDWIDTH REDISTRIBUTION

RELATED APPLICATIONS

This application claims the benefit of provisional U.S. Patent Application Ser. No. 60/037,844 filed Feb. 7, 1997.

FIELD OF THE INVENTION

The instant invention relates generally to packet-based communication systems and particularly to fair-queuing systems implemented in routers and switches in a packet-based communication system.

BACKGROUND OF THE INVENTION

Much research has been devoted to development of queuing systems for packet-based communication networks that emulates as closely as possible, an ideal "fluid flow" model, i.e., where data packets communicated from multiple sources are considered to be infinitely divisible and multiple sources may transmit their data simultaneously, e.g., on a single physical communication link. Infinite divisibility is not feasible in practice. In packet networks, typically once a packet is transmitted over the link, the whole packet must be sent, i.e., it cannot be interrupted to transfer another packet in between. As there exists a desire to provide Quality of Service "QoS" guarantees in a packet network, there is required the implementation of traffic scheduling methods in the data packet switches or routers. The function of a scheduling method is to select, for each outgoing link of a switch, the packet to be transmitted in the next cycle from the available packets belonging to the communication sessions sharing the output link. This selection must be performed such that the QoS guaranteed for the individual traffic sessions, e.g., upper bounds on maximum delay, are satisfied. Implementation of the method may be hardware or software, but because of speed considerations, scheduling is usually implemented in hardware in ATM switches and high-speed routers.

Many different scheduling methods have been proposed to approximate the theoretical scheduling discipline known as Generalized Processor Sharing (GPS) system, which is a discipline defined with respect to the "fluid" model. Such a GPS would allow for tight control of the bandwidth allocated to each session communicating on a link. However, as packets transmitted by a session cannot be divided further, the data from multiple sources must be interleaved only at packet boundaries. Thus, the GPS discipline cannot be implemented in practice in a packet-switched network.

Servicing of separate queues by simple FIFO, Round Robin, and fair queuing techniques, and the like, are well-known. However, "Weighted" fair-queuing ("WFQ") schemes have been developed that closely approximate the fluid system. Particularly, A. Demers, S. Keshav, S. Shenker, in the reference "Analysis and Simulation of a Fair Queuing Algorithm" *Internetworking: Research and Experience*, pp, 3–26, vol. 1, 1990 describe a fair queuing scheme that emulates GPS by essentially simulating a fluid flow GPS system for reference and basing packet scheduling decisions on the order of departures in the GPS system. In weighted fair queuing, each traffic session i sharing the output link controlled by the scheduling method is assigned a value $\phi_i$ corresponding to the reserved bandwidth of the session. The values $\phi_i$ are computed such that the reserved bandwidth of session i on the link is given by:

$$\frac{\phi_i}{\sum_{j=1}^{v} \phi_j}$$

where the denominator computes the sum of the $\phi_i$ values for all $v$ sessions sharing the link.

Particularly, as shown in FIG. 1, a WFQ system 100 is provided with a plurality of per-connection queues 20a, ..., 20i, with each queue storing packets in a different portion of a shared memory 25 for temporarily storing packets of information, e.g., input traffic from a source device such as a data terminal. It is understood that there can be provided different types of queues for accommodating different types of traffic, e.g., audio, video, data, etc. Additionally provided is a shaper 30a, ..., 30i that forward packets from the queues to the Weighted Fair Queueing Server with a rate exactly equal to the allocated. The Weighted Fair Queueing scheduler assumes that a weight is associated with each queue 20a, ..., 20i, respectively, so that the service offered by the scheduler to each one of these queues while they have packets waiting is always in proportion to the weights. For example, let us assume that the capacity (bandwidth) of the link C=10 packets/sec. Let us also assume that the scheduler is serving three queues; Q1 being accorded a weight WQ1= 20%, queque Q2 being accorded a weight WQ2=30%, and queue Q3 being accorded a weight WQ3=50%. Then, if all queues have packets waiting, then Q1 and Q2 will receive a guaranteed bandwidth of 2 and 3 packets/second respectively, and Q3 will receive a guaranteed bandwidth of 5 packets/second. However, if, for example, Q3 does not have any packets waiting, then the excess bandwidth is equal to 5 packets/second. In a WFQ system, this excess bandwidth is redistributed in proportion to the associated weights of the queues that have packets waiting. In the above example, when queue Q3 does not have packets waiting, the excess bandwidth will be distributed proportionally to queues Q1 and Q2 so that they now receive instaneous bandwidth of 4 and 6 packets per second respectively. Each packet leaving its respective shaper 30 is forwarded directly to a Rate Proportional Server 40 ("RPS"), which may be any weighted fair queuing variation, that forwards the packets to output link 50.

In such a WFQ scheme, beneficial properties exist such as end-to-end delay guarantees, e.g., each packet is guaranteed a certain rate for each packet flow in the stream, and, the provision of isolation between streams, e.g., a misbehaving source will not effect the flow of other streams. Additionally, an added benefit is that when there is underutilization of capacity, e.g., when flow is particularly bursty and there may be idle time, the WFQ system facilitates the redistribution of the unused bandwidth so as to preserve work-conservation property. Presently, the redistribution property of unused bandwidth capacity among the queues is done in a manner inherited from the fluid-flow model, e.g., in accordance with the weight associated with the particular queue. Thus, when the packet queues are idle, "excess" bandwidth is redistributed to backlogged connections in proportion to their weights which are based on long-term requirements.

The drawback of GPS that all fair queuing systems inherit in their close emulation of GPS is that GPS severely restricts state-dependent bandwidth sharing. The only state-dependency in GPS is in the number of backlogged connections. There is no further latitude and sharing is determined by the guaranteed rates which are set based on long term needs of the connections. This restriction on bandwidth sharing is more stringent than that necessary to preserve a key of property of fair queuing, the ability to guarantee worst case delay bounds for leaky bucket controlled traffic sources. Consequently, there is no need for fair queuing systems to emulate the possibly suboptimal excess bandwidth sharing of GPS.

It would thus be highly desirable to provide in a weighted fair queuing system emulating GPS, a method of achieving redistribution of unused bandwidth in a state-dependent manner, i.e., that reflects instantaneous needs of the remaining backlogged traffic flows.

SUMMARY OF THE INVENTION

The instant invention is a modified approach to weighted fair queuing implementing an adaptive redistribution scheme. In such a scheme, each per connection flow is guaranteed its specified share of the link bandwidth with any excess bandwidth being adaptively redistributed. The scheme enables preservation of fair queuing's ability to provide worst case end to end delay bounds and the schemes work like fair queuing when there is no excess bandwidth. The excess bandwidth may be distributed according to a different criteria. Examples of state dependent criteria are: 1) Longest delay first (LDF) that serves the flow with current longest delay; 2) Least time to overflow (LTO) that serves the flow with minimum difference between maximum allowed delay and current delay; 3) Least time to overflow with leaky buckets (LTO-LB) that serves the flow which would cause buffer overflow first if worst case arrivals happen.

Advantageously, the adaptive bandwidth redistribution scheme always provides the minimum guarantees required for each of the connections and satisfies worst case fairness measures.

The LDF policy uses excess bandwidth to reduce the variance of the delay distribution which has the added benefit of reducing the playout buffer size for voice and video sources. Simulations with video traces and with voice traffic shows that indeed this policy performs better than GPS without any sacrifice of worst case guarantees. Since the deviation from the maximum allowed delay is not taken into account, flows with small delay bounds (like voice) get almost no excess bandwidth in the presence of flows with large delay bounds. Impreciseness in assigning weights can result in these flows experiencing losses much more than flows with large delay bounds.

The LTO policy tries to minimize packet losses by assigning excess bandwidth under the assumption that the flow which is likely to overflow the quickest has the most instantaneous bandwidth need. In doing so, it takes into account the current deviation of each flow from its maximum allowed delay. Simulations with a mix of CBR, voice, and video sources with very different delay bounds show that this policy reduces losses for all classes as well as reduces the variance of delay for each class.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE INVENTION

Figure 1:
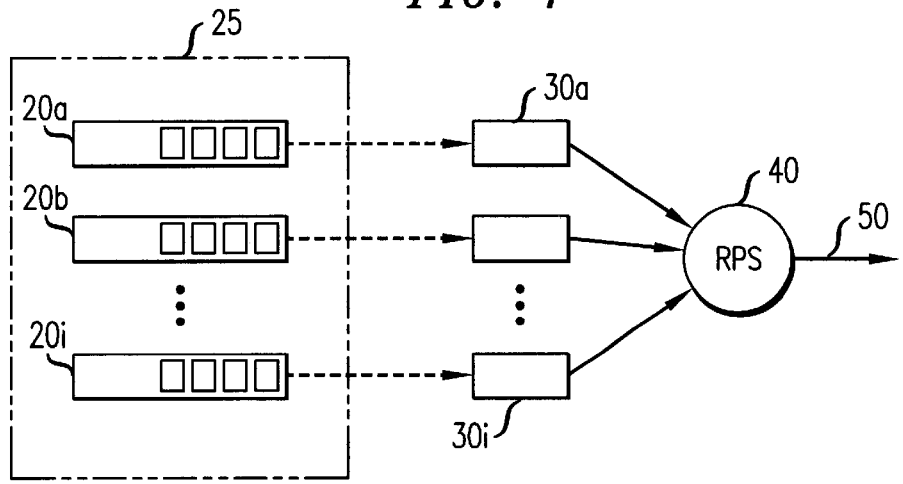
FIG. 1 is a general data flow diagram illustrating the features of the weighted fair queuing and a rate proportional Server.
Figure 2:
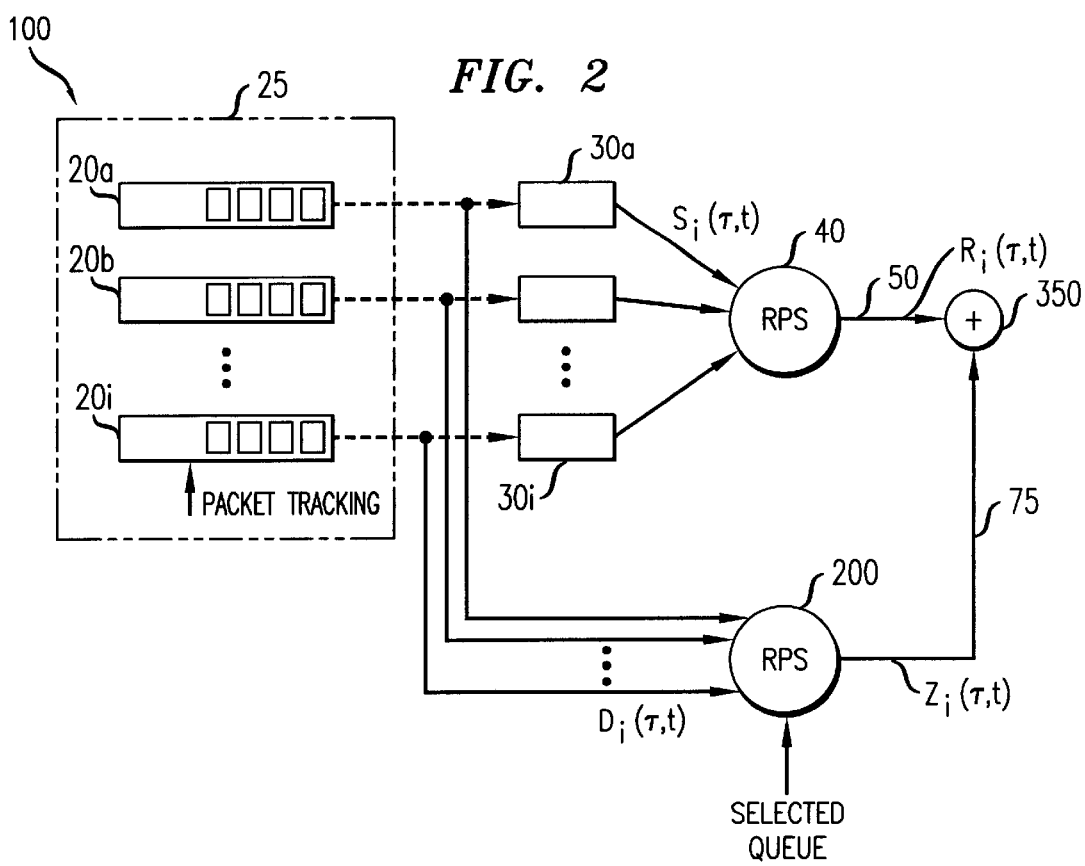
FIG. 2 illustrates the weighted fair queuing scheduling system of the invention.

FIG. 2 is a general block diagram illustrating the fair queueing method with adaptive excess bandwidth redistribution. The system consists of a set of queues 100, a shaper device 30a, . . . 30i associated with each queue, and Weighted Fair Queueing Server or Rate Proportional Server 40 and a State Dependent Server (SDS) 200. Packets are temporarily stored in the queues 20a, . . . 20i. A weight is assigned with each of these queues representing the portion of the output bandwidth that must be allocated to the packets arriving in each of the queues. The shaper device is forwarding packets from the queues to the Weighted Fair Queueing Server with a rate exactly equal to the allocated. This scenario enables excess bandwidth to become available for redistribution. In accordance with the principles of the invention, traffic from another source, i.e., another queue, may be directed to the adaptive bandwidth redistribution mechanism, which is hereafter referred to as state dependent scheduler 200. It should be understood to skilled artisans that the hardware architectures for implementation of the per-connection queues, shaper devices, and schedulers may vary, without diverting or straying from the principles of the invention described herein.

As described above, the shaper releases packets to the scheduler with a rate exactly equal to the allocated rate. The service offered by the shapers 30a, . . . ,30i to the respective queue connections "i" during an interval of time is denoted by $S_i(\tau,t)$ in FIG. 2. It is assumed that packets are transferred from the shaper to the scheduler with infinite capacity. The service offered by the rate proportional scheduler 40 is denoted as $R_i(\tau,t)$.

Packets that have not become eligible for service remain in the corresponding connection queue in the shaper, while all the eligible packets wait for service in the RPS Scheduler queue 40. Service is always provided from the RPS scheduler queues 40, as long as packets are available there. When all of the scheduler queues are empty, the state SDS 200 is invoked to select a packet from the queues 20a, . . . ,20i for transmission with the service offered to a connection not affecting the state of the shaper 30. As shown in FIG. 2, the service offered by the shaper 30 to the queue connection "i" during an interval of time is denoted by $D_i(\tau,t)$ and the service offered by the state dependent scheduler 200 is denoted as $Z_i(\tau,t)$.

The shaper device 30 can be implemented using a calendar queue that is a well known mechanism to any skilled artisans. A description of the calendar queue mechanism for shaping has been presented in D. Stiliadis and A. Verma: A General Methodology for Designing Scheduling and Shaping Algorithms, in Proceedings of IEEE INFOCOM '97.

The Rate Proportional Server (Weighted Fair Queueing Server) 40 can be implemented using any known fair queueing mechanisms of which there are several known to those skilled in the art. Examples are D. Stiliadis and A. Varma: Traffic Scheduling System and Method for Packet-Switched Networks, U.S. patent application Ser. No. 08/634, 904, filed Apr. 15, 1996 now U.S. Pat. No. 5,859,835.

At some point of time, if it is determined that there are no packets in the RPS scheduler, then this is an indication of free bandwidth. Thus, packets may be served by the SDS 200 based on a state dependent manner. By state dependent manner, it is meant that the decision is based on the current state of some variables related to the system. Two examples of state dependent decisions are Longest Delay First and Least Time to Overflow.

In the Longest Delay First, the scheduler SDS 200 selects among the queues 20a, . . . 20i, the one that has the packet that will see the longest delay if this queue is served with a rate equal to guaranteed. To do that, the scheduler assigns to each queue a delay value that is equal to the size of the queue divided by the guaranteed rate. This value describes the delay that the last packet of this queue will see. The SDS 200 selects the queue with the maximum such value using any mechanism for selecting the maximum value among a set of numbers. The selection mechanism is a well known method to any skilled artisan.

In the Least Time to Overflow mechanism, the SDS scheduler 200 selects among the queues 20a, . . . ,20i that queue which is likely to overflow in the shortest time. The mechanism assumes that a maximum size is associated with a queue. Every time a packet arrives or is serviced by a queue, a packet-to-overflow variable counts the number of packets that can be added to the queue without exceeding its maximum capacity. A second variable, denoted as time-to-overflow, indicates the expected time to overflow and is calculatec by dividing the packets-to-overflow variable by the associated rate. The SDS 200 selects for transmission the queue with the minimum time-to-overflow variable. The minimum is determined by any of the well known mechanisms to anyone skilled in the art.

Although the above variables explain two methods for calculating state dependent variables, other similar methods may be used. Based on the state dependent variables, the scheduler mechanism 200 will direct packets from the selected queues over separate link 75 where the packet will be multiplexed by multiplexer element 350 and forwarded to its next destination.

It should be understood that the property of worst case fairness is also satisfied in the system of the invention. In worst case fairness, the servicing of queues of different lengths at different allocated rates is interleaved such that a packet from a first queue is serviced at time $t_1$ and the packet of a second queue is serviced at a time $t_2$. In the invention, the measure of worst case fairness is satisfied, such that, the time interval $t_2-t_1$, in the worst case, is less than or bounded by a value that is not a function of the number of connections, but is a function of the packet size of the longest queue, e.g., the queue serviced at time $t_1$ and the allocated rate of that longest queue.

Thus, the property of worst case fairness is satisfied by the implementation of the SDS 200 in the weighted fair queuing system of the invention.

The foregoing merely illustrates the principles of the present invention. Those skilled in the art will be able to devise various modifications, which although not explicitly described or shown herein, embody the principles of the invention and are thus within its spirit and scope.

What is claimed is:

1. Apparatus for routing packets in a communication network comprising:

a plurality of per-connection queues, each queue established for receiving packets from a respective source and temporarily storing received packets before routing to a particular destination;

weighted fair queuing scheduling means servicing packets from each of said plurality of per-connection queues at guaranteed pre-allocated rates;

means for sensing a presence or absence of packets in queues, said absence of packets in queues indicating availability of excess bandwidth; and, state dependent scheduling means for redistributing excess bandwidth upon sensing of queues absent said packets, said state dependent scheduling means servicing those queues in accordance with a state variable corresponding to a performance property of said queues, wherein delay and isolation properties for routing packets of respective queues is preserved.

2. Apparatus for routing packets in a communication network as claimed in claim 1, wherein a said performance property of a queue includes the queue having the greatest amount of packets, said corresponding state variable being longest queue first.

3. Apparatus for routing packets in a communication network as claimed in claim 1, wherein a said performance property of a queue includes that queue having a packet waiting to be serviced in the longest amount of time, said corresponding state variable being longest delay first.

4. Apparatus for routing packets in a communication network as claimed in claim 1, wherein a said performance property of a queue includes the queue most likely to overflow buffer memory containing said queue, said corresponding state variable being most likely to overflow buffer.

5. Apparatus for routing packets in a communication network as claimed in claim 1, wherein a worst case fairness measure for said connections is satisfied.

6. Method for routing packets in a communication network comprising:

establishing a plurality of per-connection queues, each queue for receiving packets from a respective source and temporarily storing received packets before routing to a particular destination;

servicing packets from each of said plurality of per-connection queues at guaranteed pre-allocated rates;

sensing a presence or absence of packets in queues, said absence of packets in queues indicating availability of excess bandwidth; and, for redistributing excess bandwidth upon sensing of queues absent said packets, said state dependent scheduling means servicing those queues in accordance with a state variable corresponding to a performance property of said queues, while preserving delay and isolation properties for routing of said packets.

7. Apparatus for routing packets in a communication network comprising:

a plurality of per-connection queues, each queue established for receiving packets from a respective source and temporarily storing received packets before routing to a destination;

a weighted fair queuing (WFQ) server coupled to receive packets from each of said plurality of per-connection queues, and as a WFQ output, schedule packets for delivery;

means for sensing an absence of packets in each of said plurality of per-connection queues;

a state dependent server (SDS) coupled to receive packets from each of said plurality of per-connection queues, and as an SDS output, schedule packets for delivery upon sensing said absence of packets in at least one of said plurality of per-connection queues; and a multiplexer coupled to receive said WFQ and SDS outputs, to multiplex packets scheduled by said WFQ server with packets scheduled by said SDS, for delivery to said destination.

8. A method for routing packets comprising:

queuing packets in a plurality of per-connection queues, each queue utilized for receiving packets from a respective source and temporarily storing received packets before routing to a destination;

scheduling packets for delivery from a first scheduling server, from among said plurality of per-connection queues, based upon a weighted fair queuing (WFQ) priority;

monitoring each of said plurality of per-connection queues to sense an absence of queued packets in at least one of said plurality of per-connection queues;

scheduling packets for delivery from a second scheduling server, from among said plurality of per-connection queues, based upon any state dependent priority; and multiplexing packets scheduled from said first scheduling server and said second scheduling server for delivery to said destination.

* * * * *